US008491801B1

United States Patent
Tanner et al.

(10) Patent No.: US 8,491,801 B1
(45) Date of Patent: Jul. 23, 2013

(54) METHOD AND SYSTEM FOR PROVIDING AN NFT USING A SACRIFICIAL NFT STRUCTURE

(75) Inventors: Shawn M. Tanner, San Jose, CA (US); Yufeng Hu, Fremont, CA (US); Ut Tran, San Jose, CA (US); Zhongyan Wang, San Ramon, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 76 days.

(21) Appl. No.: 13/291,702

(22) Filed: Nov. 8, 2011

(51) Int. Cl.
*B44C 1/22* (2006.01)
*G11B 5/127* (2006.01)

(52) U.S. Cl.
USPC ............... 216/22; 216/41; 216/63; 216/66; 216/88; 29/603.07; 29/603.16

(58) Field of Classification Search
USPC .............. 216/22, 41, 63, 66, 88; 29/603.07, 29/603.16
See application file for complete search history.

(56) References Cited

U.S. PATENT DOCUMENTS

| | | | |
|---|---|---|---|
| 6,795,630 B2 | 9/2004 | Challener et al. | |
| 7,272,079 B2 | 9/2007 | Challener | |
| 7,330,404 B2 | 2/2008 | Peng et al. | |
| 7,440,660 B1 | 10/2008 | Jin et al. | |
| 8,307,540 B1 * | 11/2012 | Tran et al. | 29/603.16 |
| 2003/0184903 A1 | 10/2003 | Challener | |
| 2005/0078565 A1 | 4/2005 | Peng et al. | |
| 2010/0104768 A1 * | 4/2010 | Xiao et al. | 427/552 |
| 2010/0123965 A1 | 5/2010 | Lee et al. | |
| 2010/0123967 A1 | 5/2010 | Batra et al. | |

* cited by examiner

*Primary Examiner* — Shamim Ahmed

(57) ABSTRACT

A method and system provides a near-field transducer (NFT) for an energy assisted magnetic recording (EAMR) transducer. The method and system include forming a sacrificial NFT structure having a shape a location corresponding to the NFT. A dielectric layer is deposited. A portion of the dielectric layer resides on the sacrificial NFT structure. At least this portion of the dielectric layer on the sacrificial structure is removed. The sacrificial NFT structure is removed, exposing an NFT trench in the dielectric layer. At least one conductive layer for the NFT is deposited. A first portion of the conductive layer(s) reside in the NFT trench. A second portion of the conductive layer(s) external to the NFT trench is removed to form the NFT.

13 Claims, 15 Drawing Sheets

Side View

Top View

METHOD AND SYSTEM FOR PROVIDING AN NFT USING A SACRIFICIAL NFT STRUCTURE

BACKGROUND

FIG. 1 depicts a portion of a conventional energy assisted magnetic recording (EAMR) transducer 10. The conventional EAMR transducer 10 includes a conventional waveguide 12 having a conventional core 18 and cladding 14 and 16, a grating 20, a conventional near-field transducer (NFT) 30, and a write pole 40. The NFT 30 has a disk portion 34 and a pin portion 32. The pin portion 32 is between the disk portion 34 and the air-bearing surface (ABS). The conventional EAMR transducer 10 is used in writing to a recording media and receives light, or energy, from a conventional laser (not shown). In operation, light from a laser is coupled to the waveguide 12. Light is guided by the conventional waveguide 12 to the NFT 30 near the ABS. The NFT 30 utilizes local resonances in surface plasmons to focus the light to magnetic recording media (not shown), such as a disk. The surface plasmons used by the NFT 30 are electromagnetic waves that propagate along metal/dielectric interfaces. At resonance, the NFT 30 couples the optical energy of the surface plasmons efficiently into the recording medium layer with a confined optical spot which is much smaller than the optical diffraction limit. This optical spot can typically heat the recording medium layer above the Curie point in nano-seconds. High density bits can be written on a high coercivity medium with a pole 40 having modest magnetic field.

FIG. 2 depicts a conventional method for providing the NFT 30 in the conventional EAMR transducer 10. Referring to FIGS. 1 and 2, a layer of conductive material is deposited for the NFT, via step 52. Typically the conductive material is gold. The conductive layer is masked, via step 54. The mask covers the portion of the conductive layer that will form the NFT 30. The exposed portion of the conductive layer is removed, via step 56. Step 56 typically includes performing an ion mill. More specifically, an overmill step is performed. The overmilling ensures that the walls of the NFT 30 are vertical and that any tail from the conductive layer is completely removed from the region surrounding the NFT 30. Thus, the NFT 30 is formed. Fabrication of the conventional EAMR transducer 10 may then be completed.

Although the conventional method 10 may form the conventional NFT 30, there are drawbacks. In particular, fabrication of the conventional NFT 30 may have low yield and/or higher variations than desired. For example, the overmilling in step 56 may result in a significant variation in the critical dimensions of the conventional NFT 30. The conventional NFT 30 is on the order of fifty nanometers thick. If overmilling is not performed, then the walls of the NFT 30 may not be vertical. The top of the NFT 30 shown as dotted lines in FIG. 1) may be less wide than the bottom of the NFT 30 (shown as a solid line in FIG. 1). Thus, there is a variation of the critical dimension within the NFT, shown as CDA and CDB, of the conventional NFT 30. Thus, variations in the critical dimensions may still occur even if overmilling not performed. Further, the conventional core 16 of the waveguide 12 is on the order of ten to fifteen nanometers thick. The overmilling in step 58 may remove a significant portion of the core 16. Thus, step 58 may damage the underlying waveguide 12, which is undesirable.

Accordingly, what is needed is a system and method for improving manufacturability of an EAMR transducer.

BRIEF SUMMARY OF THE INVENTION

A method and system provides a near-field transducer (NFT) for an energy assisted magnetic recording (EAMR) transducer. The method and system include forming a sacrificial NFT structure having a shape a location corresponding to the NFT. A dielectric layer is deposited. A portion of the dielectric layer resides on the sacrificial NFT structure. At least this portion of the dielectric layer on the sacrificial NFT structure is removed. The sacrificial NFT structure is removed, exposing an NFT trench in the dielectric layer. At least one conductive layer for the NFT is deposited. A first portion of the conductive layer(s) resides in the NFT trench. A second portion of the conductive layer(s) external to the NFT trench is removed to form the NFT.

DETAILED DESCRIPTION OF THE EMBODIMENTS OF THE INVENTION

Figure 1:
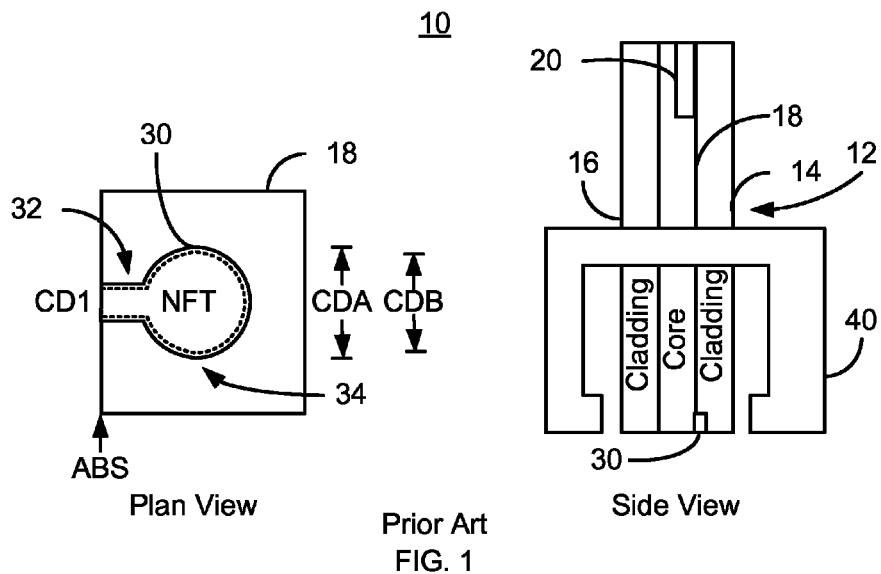
FIG. 1 is a flow chart depicting a conventional EAMR transducer.
Figure 2:
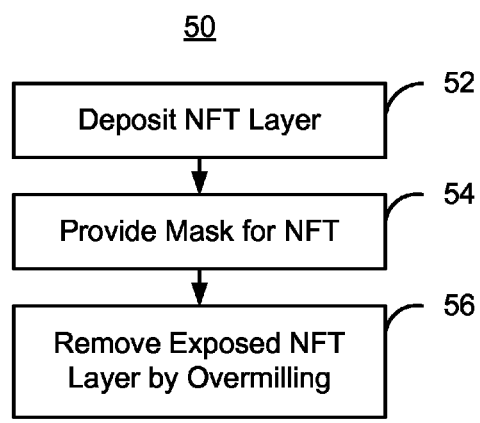
FIG. 2 is a diagram depicting a plan and side views of a conventional NFT formed using a conventional method for fabricating an NFT.
Figure 3:
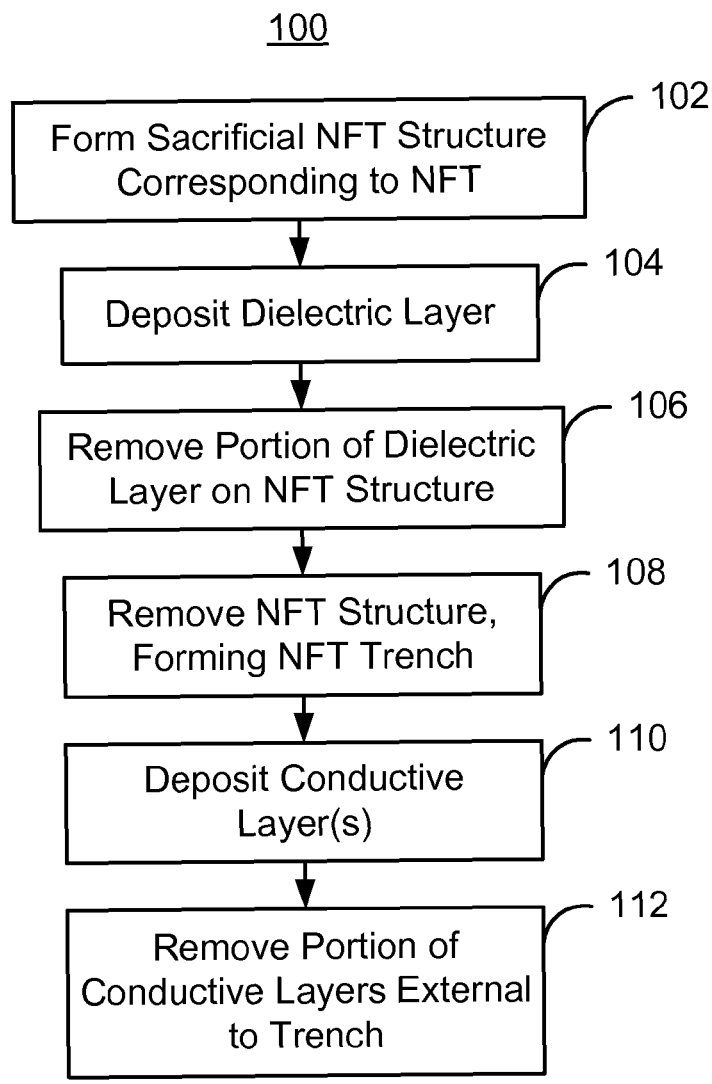
FIG. 3 is a flow chart depicting an exemplary embodiment of a method for providing an NFT having in an EAMR transducer.

FIG. 3 depicts one embodiment of a method 100 for fabricating an NFT for an EAMR transducer. For simplicity, some steps may be omitted, interleaved, and/or combined. The EAMR transducer being fabricated may be part of a merged head that also includes a read head and resides on a slider in a disk drive. The method 100 is also described in the context of providing a single EAMR transducer. However, the method 100 may be used to fabricate multiple transducers at substantially the same time. The method 100 is also described in the context of particular layers. However, in some embodiments, such layers may include multiple sub-layers. The method 100 also may commence after formation of other portions of the EAMR transducer. In one embodiment, the method 100 commences after formation of portions of the waveguide, such as a core. Thus, a flat surface for formation of subsequent structures may have been provided. Certain steps of the method 100 may be combined, omitted, performed in another order and/or interleaved.

A sacrificial NFT structure is formed, via step 102. The sacrificial NFT structure has a shape and location corresponding to the NFT. The sacrificial layer may thus reside on the core or the cladding of the waveguide. The sacrificial NFT structure may have a pin portion and a disk portion corresponding to the pin and disk, respectively, to the NFT being formed. The pin portion resides between the disk portion and the ABS location (the location at which the ABS is desired to reside). Although described as a disk, in some embodiments, the disk need not have a circular footprint. In some embodiments, step 102 includes forming the sacrificial NFT structure from a material that may be removed using a reactive ion etch (RIE), such as amorphous carbon.

In some embodiments, step 102 includes multiple substeps. For example, one or more sacrificial layers may be deposited in the desired region. One or more hard mask layers may be deposited on the sacrificial layer(s). A pattern may be formed in the hard mask layer corresponding to the shape and location of the NFT structure. For example, a photoresist pattern may be used to transfer the pattern to the hard mask layer(s). In some embodiments, this also includes multiple substeps. For example, a photoresist mask corresponding to the disk portion may be used to transfer a post pattern corresponding to the disk portion to a top hard mask layer. Another photoresist mask having a line pattern corresponding to the pin portion may be used in conjunction with the post pattern in the top hard mask layer to transfer the pattern corresponding to the disk and pin to another hard mask layer. In such an embodiment, the second hard mask layer has a high selectivity with respect to the first hard mask layer. For example, the selectivity may be at least 10. The pattern of the hard mask may then be transferred to the sacrificial layer(s), forming the sacrificial NFT structure. In other embodiments, a different process may be used to transfer the pattern to the sacrificial NFT structure.

A dielectric layer is deposited, via step 104. Step 104 occurs after step 102. A portion of the dielectric layer is on the sacrificial NFT structure. The dielectric layer may cover the NFT structure. The step of depositing the dielectric may include depositing silicon dioxide, aluminum oxide, or some other dielectric. Further, in some embodiments, multiple dielectrics may be used. For example, the dielectric layer deposited in step 104 may include multiple sublayers.

At least the portion of the dielectric layer on the sacrificial NFT structure is removed, via step 106. In some embodiments, step 106 may include performing a planarization. For example, a chemical mechanical planarization (CMP) may be employed. For example, a photoresist mask that covers at least the sacrificial NFT structure may be provided. A hard mask layer may then be deposited, and the photoresist mask lifted off. Thus, the portion of the dielectric layer above the sacrificial NFT structure is exposed. The CMP may then be performed. As a result, the sacrificial structure may be exposed.

The sacrificial NFT structure is removed, via step 110. This exposes, or forms, an NFT trench in the dielectric layer. The NFT trench has the shape and location of the sacrificial NFT structure. Step 110 may include performing an RIE appropriate to the material used in the sacrificial NFT structure. For example, if amorphous carbon is used for the sacrificial NFT structure, then an amorphous carbon RIE could be performed. The selectivity of the RIE or other removal process for the material used in the sacrificial NFT structure versus the dielectric layer and/or layer under the sacrificial NFT structure is desired to be high. Thus, little or no portion of the dielectric layer and/or underlying layer may be removed in step 110. Consequently, the shape and location of the NFT trench formed in step 110 may closely match the shape and location of the sacrificial NFT structure.

At least one conductive layer for the NFT is deposited, via step 110. In some embodiments, the conductive layer includes gold. In some such embodiments, the conductive layer consists of gold. In other embodiments, a gold alloy, another element and/or another material may be used. A first portion of the conductive layer(s) reside in the NFT trench. In some embodiments a single conductive layer may be deposited. In alternate embodiments, a multilayer might be used.

A second portion of the conductive layer(s) external to the NFT trench are removed, via step 112. The remaining conductive material forms the NFT. In some embodiments, substantially all of the remaining conductive material resides in the NFT trench. In some embodiments, step 112, is performed using a high angle ion mill. For example, an ion mill at an angle of at least seventy degrees may be used. In order to facilitate the high angle ion mill, a self-leveling layer may be deposited before the high angle ion mill is performed. For example, a layer of photoresist may be spun on prior to the high angle ion mill.

Figure 4:
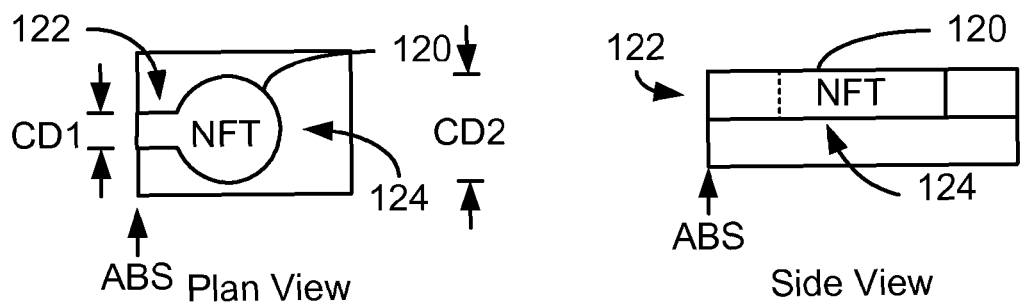
FIG. 4 is a diagram depicting plan and side views of an exemplary embodiment of an NFT formed using an exemplary embodiment of the method.

Using the method 100 an NFT may be fabricated. For example, FIG. 4 depicts plan and side views of an NFT 120 fabricated using the method 100. FIG. 4 is not to scale. The NFT 120 shown in FIG. 4 is generally part of an EAMR transducer. The NFT 120 includes a pin 122 and a disk 124 having critical dimensions CD1 and CD2, respectively. As can be seen in FIG. 4, the sidewalls of the NFT 120 are substantially vertical. The vertical sidewalls are achieved without an ion milling step that overmills the transducer. In addition, the layer under the NFT 120 is not damaged as no overmill has been performed. Thus, the geometry of the NFT 120 is improved.

Figure 5:
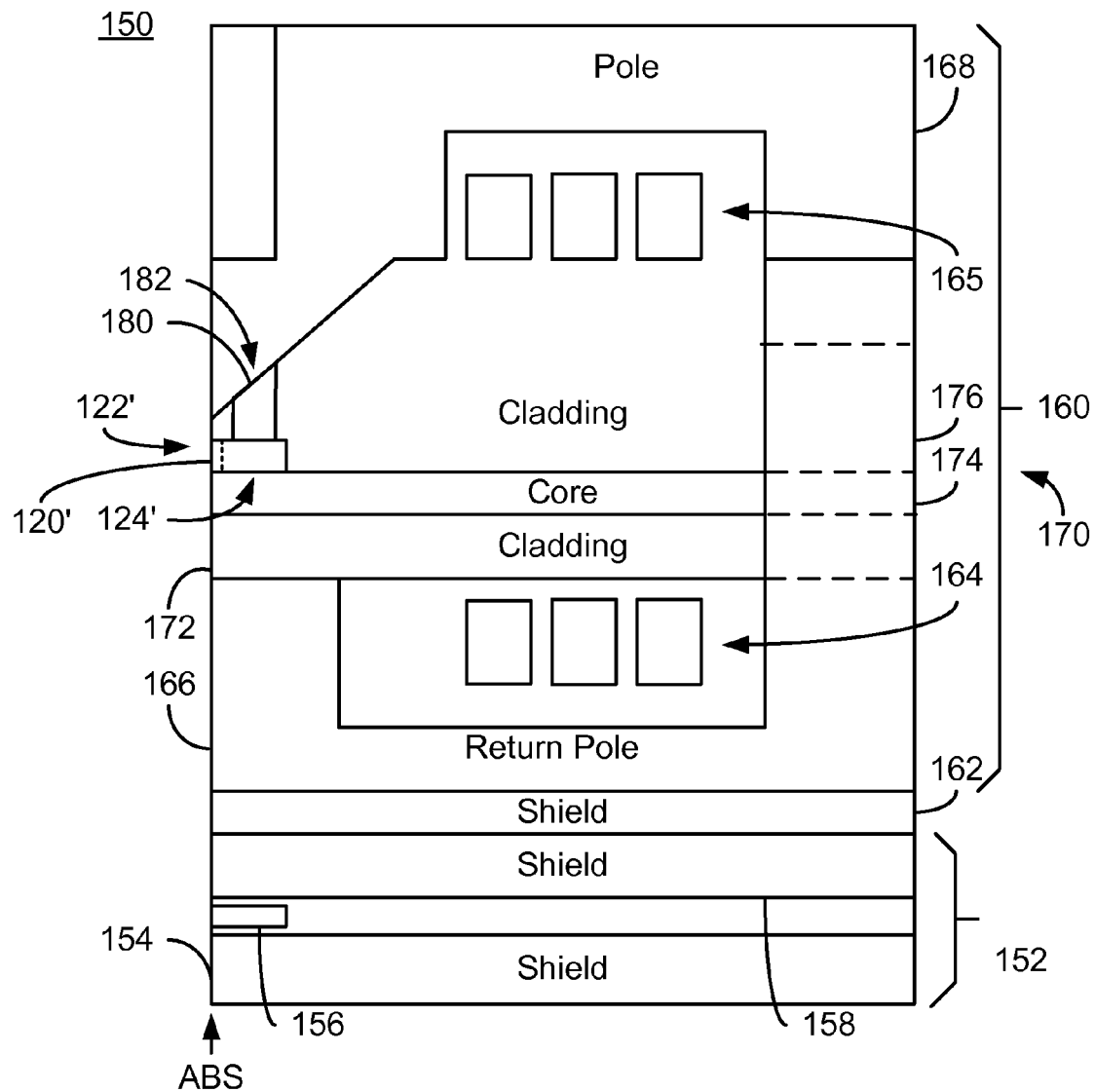
FIG. 5 is a diagram depicting an exemplary embodiment of an EAMR head employing an NFT.

FIG. 5 depicts a head 150 utilizing the NFT 120. FIGS. 4-5 are not to scale. Referring to FIGS. 4-5, for simplicity, not all portions of the EAMR head 150 are shown. In addition, although the EAMR head 150 is depicted in the context of particular components other and/or different components may be used. Further, the arrangement of components may vary in different embodiments. The EAMR head 150 may be used in an EAMR disk drive. The EAMR head 150 includes a read transducer 152 and a write transducer 160. The read transducer 152 includes shields 154 and 158 and reader sensor 156. In some embodiment, the read sensor 156 may be a giant magnetoresistance sensor, such as a spin tunneling junction. However, in other embodiments, another sensor may be used.

The EAMR transducer 160 includes waveguide 170, write pole 168, return pole 166, coil(s) 164 and 165, and shield 162. The EAMR transducer 160 may also include a grating (not shown) that is used to couple light from the laser (not shown) to the waveguide 170. The coil(s) 164 may be used to energize the write pole 140 during writing. In the embodiment shown, the shield 162 is depicted as separate from the return pole 166. However, in another embodiment, these components may be combined. The waveguide 170 includes cladding 172 and 176 as well as core 174. Further, the waveguide 170 is shown as residing between the pole 168 and return pole 166. In another embodiment, the pole 168 may be between the waveguide and the return pole 166. The coils 164 and 165 may form a single, helical coil or may be separate pancake coils.

The EAMR transducer 150 also includes an NFT 120' and heat sink 180. The NFT 120' is analogous to the NFT 120. The NFT 120' thus includes a disk portion 124' and a pin portion 122' analogous to the disk portion 124 and pin portion 122, respectively. The pin portion 122' is between the disk portion 124' and the ABS. Thus, the disk portion 124' is recessed from the ABS The disk portion 124' extends further in the track width direction (perpendicular to the plane of the page in FIG. 5) than the pin portion 122'. As can be seen in FIG. 5, the sidewalls of the NFT 120' are substantially vertical.

The heat sink 180 is in thermal contact with the disk portion 124' of the NFT 120'. The heat sink 180 also has a top surface 182 in thermal contact with the pole 168. In the embodiment shown, the heat sink 180 is in direct physical contact with the NFT 120' and the pole 168. The top surface 182 of the heat sink 180 is sloped because the bottom surface of the pole 168 is sloped. In the embodiment shown, a portion of the bottom surface of the pole 168 proximate to the ABS is not parallel to the top surface of the NFT 100'. In some embodiments, this portion of the bottom surface of the pole 168 may be configured to be parallel to the top surface of the NFT 100'.

In operation the waveguide 170 directs energy from the laser to the ABS and more specifically to the NFT 120'. The NFT 120' is optically coupled with the waveguide 170, receiving energy from the core 174. The NFT 120' is also proximate to the ABS. For example, the NFT 120' is shown as having a surface of the pin portion 122' occupying part of the ABS. The NFT 120' focuses energy from the waveguide 170 onto a region of the media (not shown). In particular, a surface plasmon resonance is developed across the disk portion 124' of the NFT 120'. This resonance allows the NFT 120' to deliver optical energy to the media (not shown) in a small thermal spot. The write pole 168 is configured to write to the region of the media heated by the NFT 120'. The heat sink 180 is thermally coupled near its bottom with the NFT 120' and at its top with the bottom surface of the pole 168. During operation, therefore, heat generated at the NFT 120' may be conducted by the heat sink 180 away from the NFT 120' and to the pole 168.

The EAMR transducer 160 and thus the EAMR head 150 may have improved performance and reliability. Because the NFT 120' is formed using the method 100, the NFT 120' may have the desired geometry. This geometry allows for a smaller variation in the critical dimensions of the NFT 120'. Further, the core 174' may not be damaged as the geometry of the NFT 120' may be attained without an overmill. Consequently, the desired NFT 120' may be provided. Performance and reliability of the NFT 120' and EAMR head 150 may thus be improved.

Figure 6:
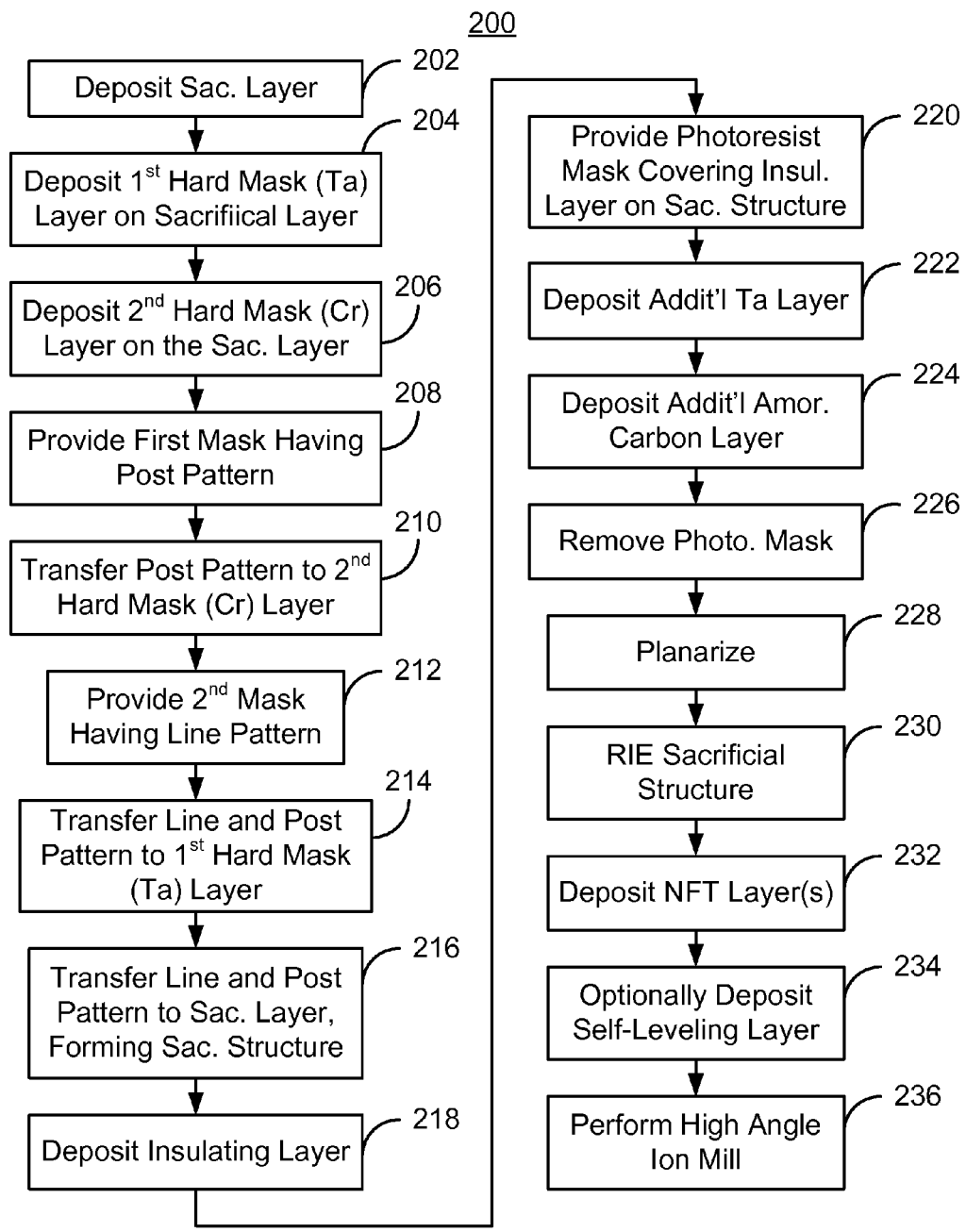
FIG. 6 is a flow chart depicting another exemplary embodiment of a method for providing an NFT in an EAMR transducer.

FIG. 6 is a flow chart depicting an exemplary embodiment of a method 200 for fabricating an EAMR transducer having a self-aligned heat sink. For simplicity, some steps may be omitted, interleaved and/or combined. FIGS. 7-17 are diagrams depicting side and top views of an exemplary embodiment of a portion of an EAMR transducer during 250 fabrication. For clarity, FIGS. 7-17 are not to scale. Further, although FIGS. 7-17 depict the ABS location (location at which the ABS is to be formed) and ABS at a particular point in the pole, other embodiments may have other locations for the ABS. Referring to FIGS. 5-17, the method 200 is described in the context of the EAMR transducer 250. However, the method 200 may be used to form another device (not shown). The EAMR transducer 250 being fabricated may be part of a merged head that also includes a read head (not shown in FIGS. 7-17), a laser (not shown in FIGS. 7-17) and resides on a slider (not shown) in a disk drive. In addition, other portions of the EAMR transducer 250, such as the pole(s), shield(s), coil(s), and remaining optics are not shown. The method 200 also may commence after formation of other portions of the EAMR transducer 250. The method 200 is also described in the context of providing a single EAMR transducer 250 and a single NFT in the EAMR transducer 250. However, the method 200 may be used to fabricate multiple transducers and/or multiple heat sinks per transducer at substantially the same time. The method 200 and device 250 are also described in the context of particular layers. However, in some embodiments, such layers may include multiple sublayers.

Steps 202, 204, 206, 208, 210, 212, 214, and 216 are used to form a sacrificial NFT structure and are thus analogous to step 102 of the method 100. A sacrificial layer is deposited, via step 202. Step 202 may include depositing a layer of amorphous carbon on the core of the waveguide. In other embodiments, materials other than amorphous carbon may be used. The materials used are desired to have a high selectivity with respect to the underlying core material as well as the dielectric deposited in step 218, described below. In some embodiments, the sacrificial layer is deposited on silicon dioxide. Hard mask layers are also deposited on the sacrificial layer, via step 204 and 206. In particular, a Ta hard mask layer is deposited in step 204. A Cr layer is deposited in step 206. In other embodiments, other hard mask layers could be deposited in step 204 and/or 206. However, the selectivity between the hard mask layers is desired to be high, for example at least ten.

Figure 7:
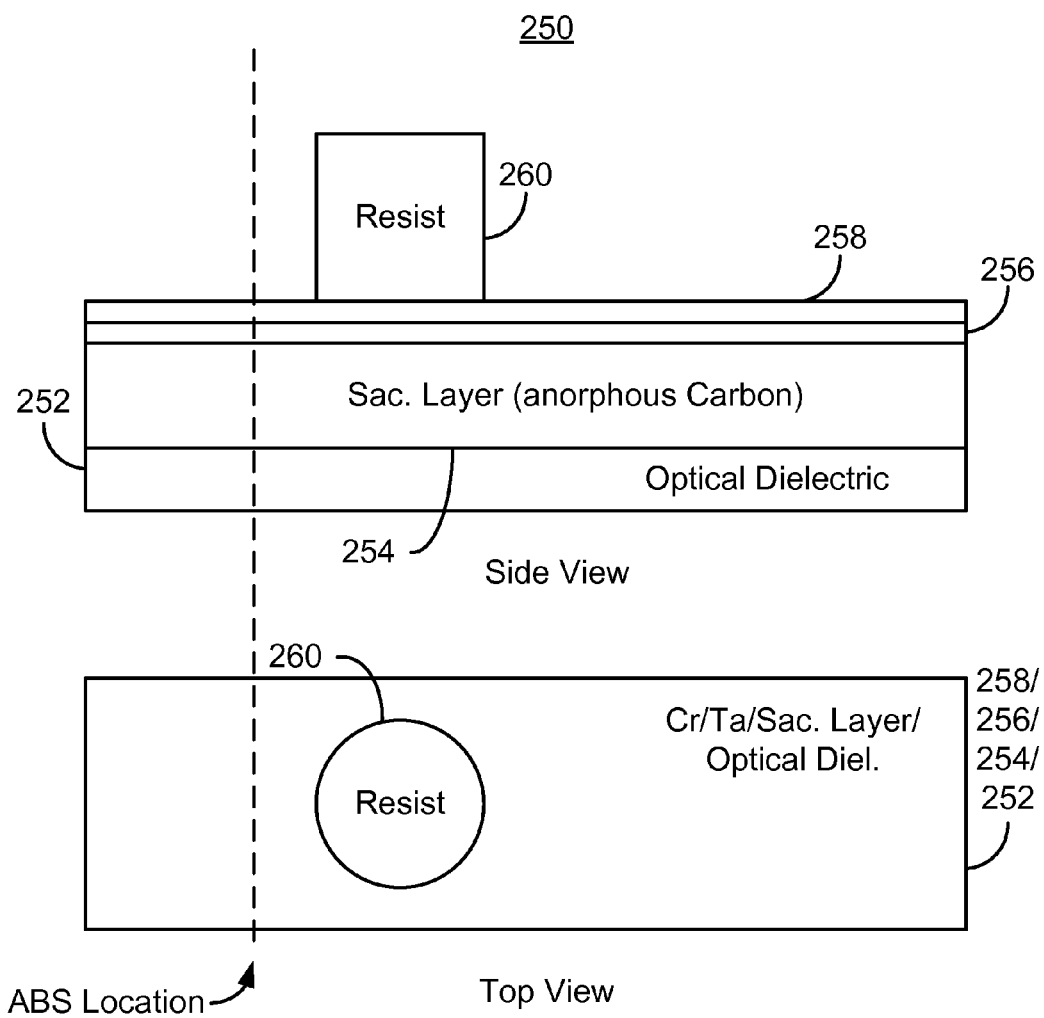
FIGS. 7-17 are diagrams depicting an exemplary embodiment of a magnetic recording transducer during fabrication.

Steps 208, 210, 212, and 214 are used in forming a hard mask for transferring the pattern for the NFT to the sacrificial layer. Although depicted in a particular order, other orders may be used. A photoresist mask used in patterning the Cr layer is provided, via step 208. In some embodiments, the photoresist mask is used in patterning the disk portion of the NFT. Thus, the photoresist mask may have a post pattern having a circular footprint. FIG. 7 depicts the transducer 250 after step 208 is performed. Thus, a sacrificial layer 254 is shown on the optical dielectric 252. The Ta layer 256 and Cr layer 258 are also shown. Further, the photoresist mask 260 formed in step 218 is also shown. Thus, in the embodiment depicted, the disk of the NFT has a circular footprint.

Figure 8:
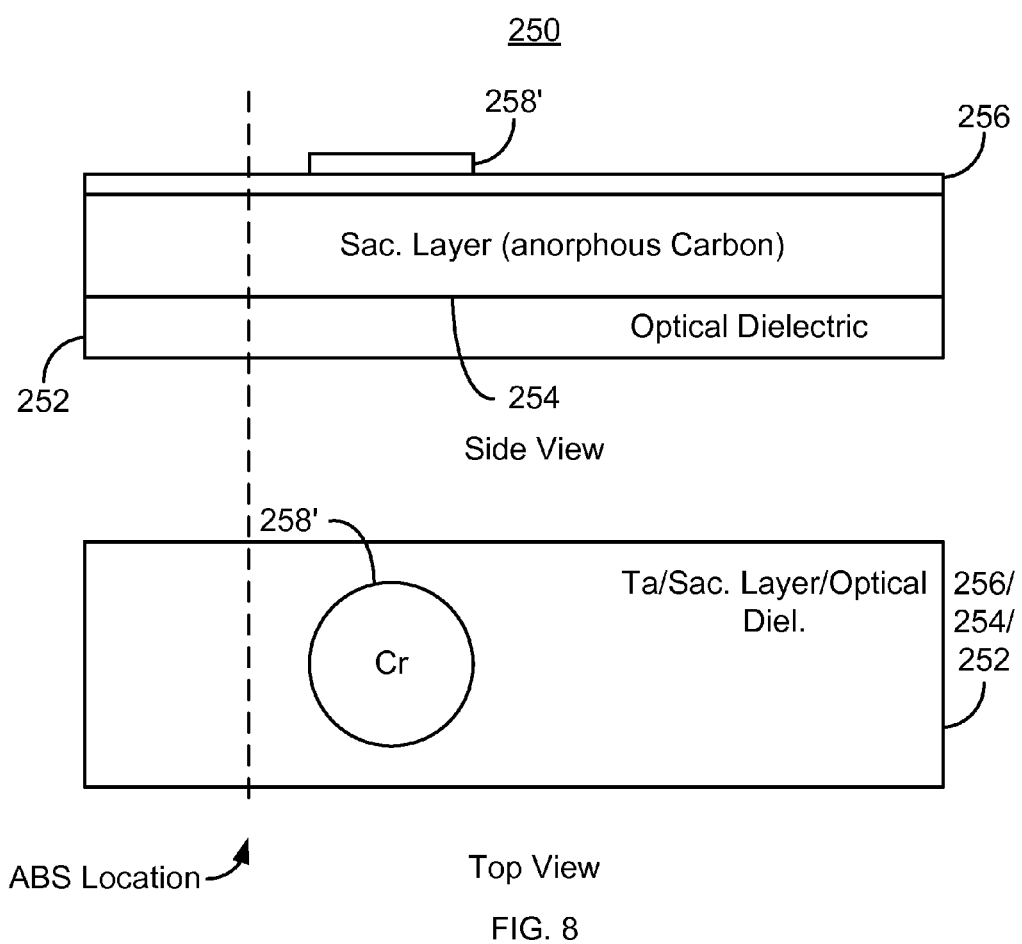

The post pattern of the mask 260 is transferred to the Cr layer 258, via step 210. Step 210 may include performing a Cr RIE. FIG. 8 depicts the EAMR transducer 250 after step 210 is performed. The post pattern has been transferred to the Cr layer, leaving a Cr disk 258'. Because the selectivity between the Ta layer 256 and the Cr layer 258 is high, the Ta layer 256 is substantially undamaged after step 210 is concluded.

Figure 9:
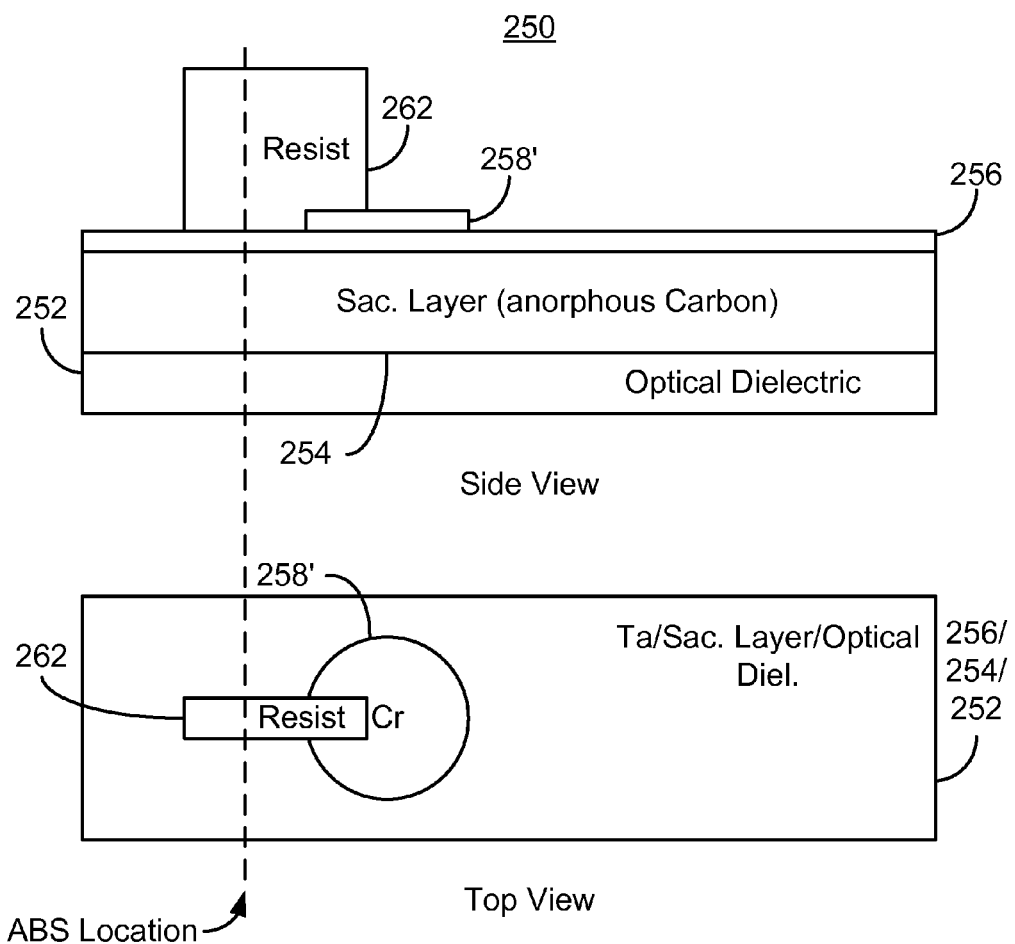
Figure 10:
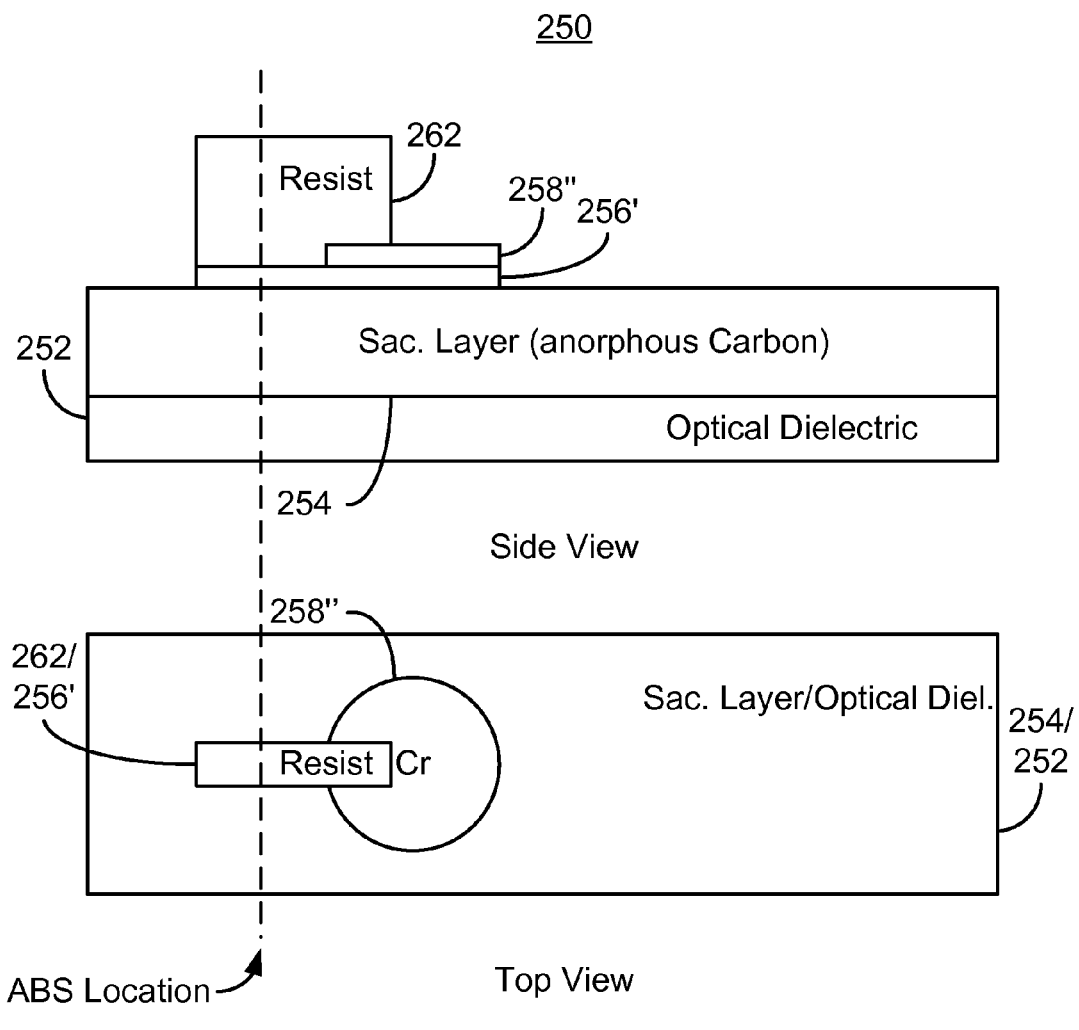

A second photoresist mask having a line pattern corresponding to the pin is provided, via step 212. FIG. 9 depicts the EAMR transducer 250 after step 212 is performed. Thus, a photoresist mask 262 is shown. In the embodiment shown, the photoresist mask 262, and thus the pin, have sidewalls extending substantially perpendicular from the ABS location. However, in other embodiments, other angles may be used. The line pattern is transferred to the Ta layer 256, via step 214. In some embodiments, step 214 includes performing a Ta RIE. FIG. 10 depicts EAMR transducer 250 after step 214 is performed. Thus, the line pattern of the resist mask 262 and the disk pattern of the Cr have been transferred to the Ta layer 256'. Thus, the remaining portion of the Ta layer 256' includes both a pin portion and a disk portion. Because of the high selectivity between the layers 256 and 258', the transfer of the pattern in step 214 leaves the Cr disk 258" substantially unaffected.

Figure 11:
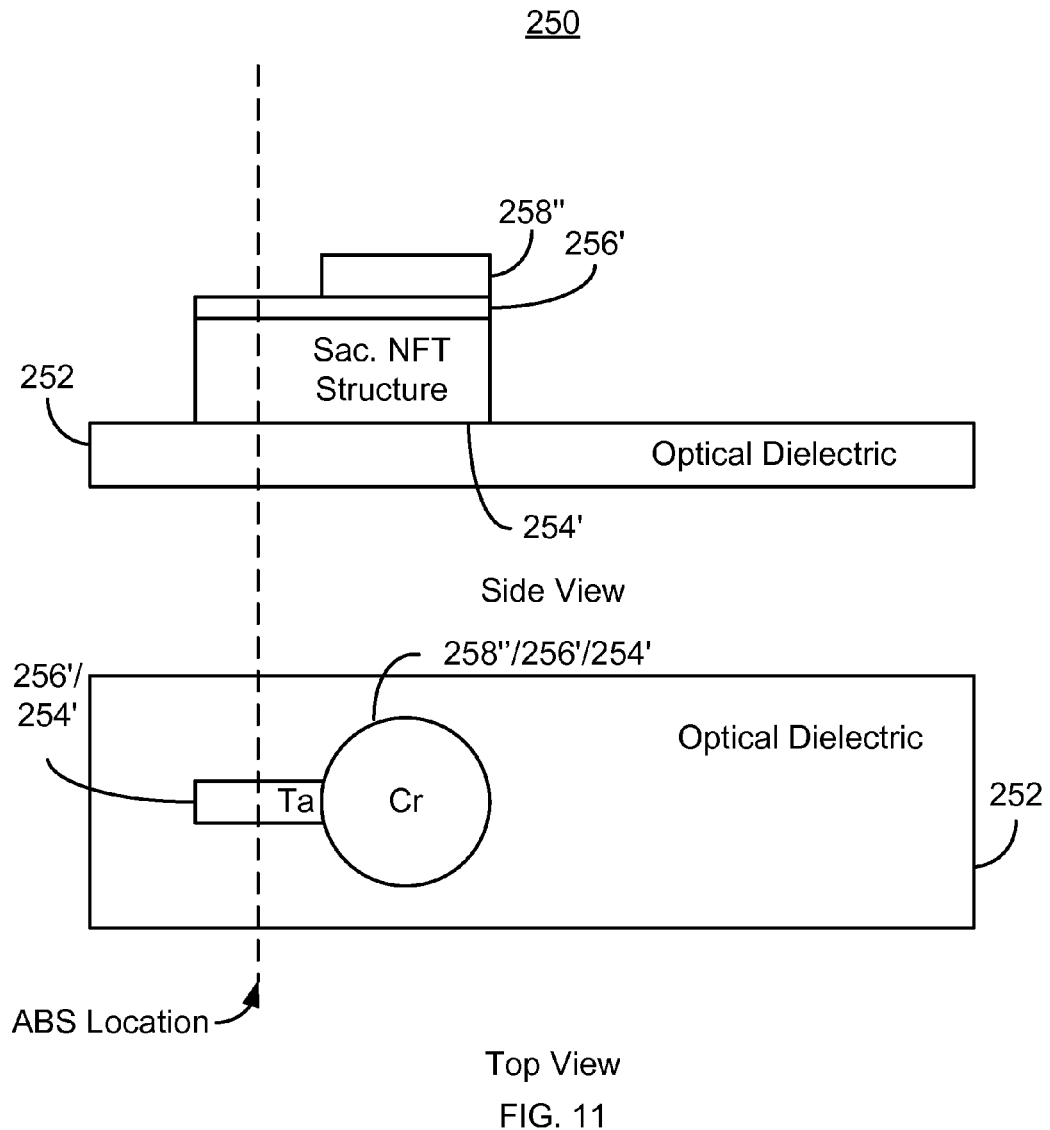

The pattern in the Ta layer 256', as well as the post pattern in the Cr layer 258" are transferred to the sacrificial layer 254, via step 216. Step 216 includes performing an amorphous carbon RIE. FIG. 11 depicts the EAMR transducer 250 after step 216 is performed. Thus, the sacrificial NFT structure 254' has been formed. As discussed above, steps 212-216 are analogous to step 102 of the method 100. In the embodiment shown, a portion of the Cr disk 258" and the Ta layer 256' remain. However, in other embodiments, one or more of these structures may be removed. The sacrificial NFT structure 254' has the desired shape and location of the NFT being fabricated.

Figure 12:
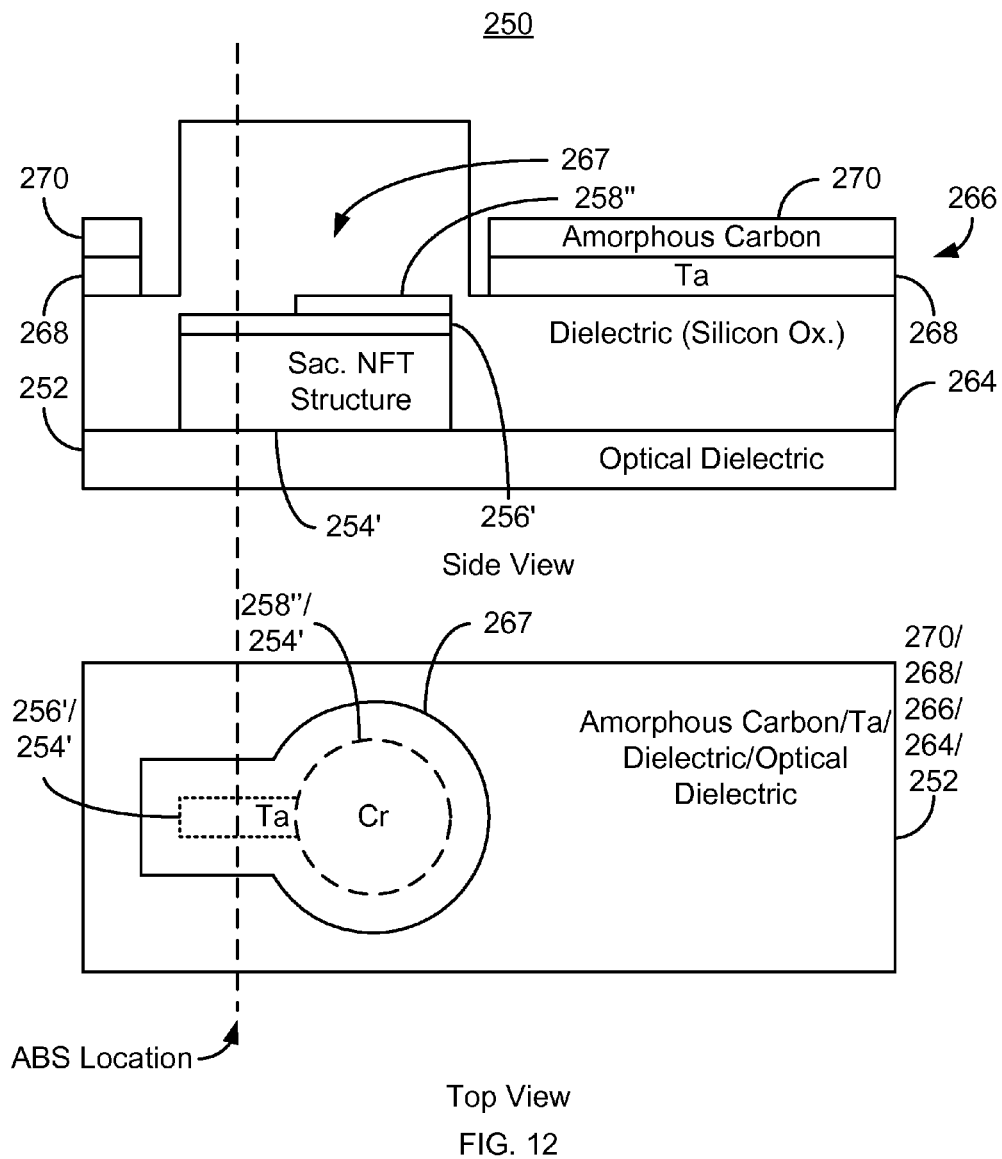

An insulating layer is deposited, via step 218. Step 218 is analogous to step 104 of the method 100. In some embodiments, step 218 includes depositing a silicon dioxide layer. In other embodiments, another optical dielectric may be used. At least part of the silicon dioxide layer is on the sacrificial NFT structure 254'. A photoresist mask is provided on the silicon dioxide layer, via step 220. The photoresist mask covers at least part of the silicon dioxide layer that is on the sacrificial NFT structure 254'. An additional Ta layer is deposited, via step 222. An additional amorphous carbon layer is also deposited, via step 224. The photoresist mask is then removed, via step 226. This removes portions of the Ta layer and amorphous carbon layer that are on the photoresist mask. Thus, a hard mask having an aperture above the sacrificial NFT structure 254' is formed. FIG. 12 depicts the EAMR transducer 250 after step 226 is performed. Thus, silicon dioxide layer 264 is shown. Also depicted is hard mask 266 including a Ta layer 268 and amorphous carbon layer 270. The hard mask 266 includes aperture 267. The amorphous carbon layer 270 of the hard mask 266 can be considered to be a hard mask layer for a planarization, while the Ta layer 268 can be an endpoint layer.

Figure 13:
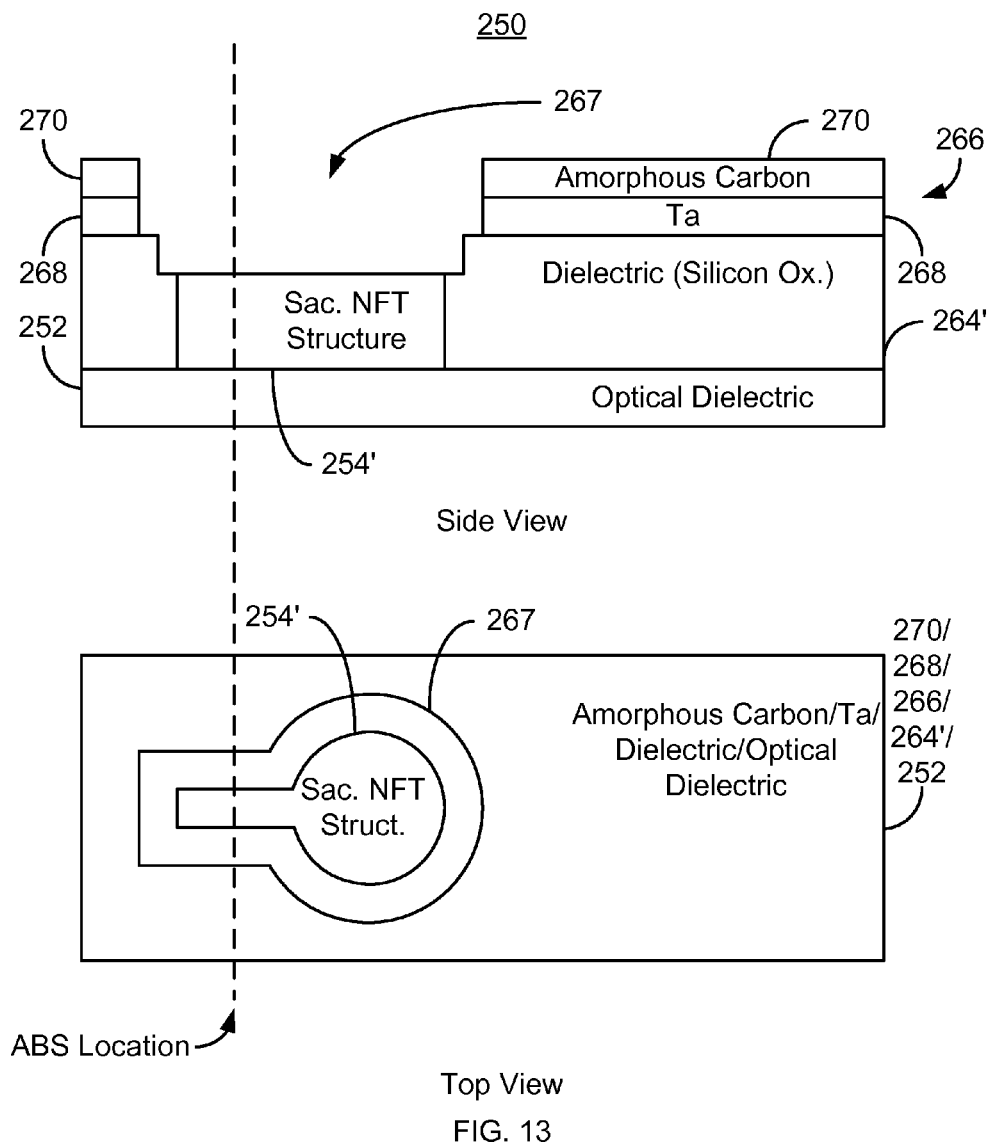

The EAMR transducer is planarized, via step 228. Step 228 generally includes performing a chemical mechanical planarization (CMP). The planarization removes the portion of the silicon dioxide layer 264 above the sacrificial NFT structure 254'. In some embodiments, an additional ion mill may also be performed to remove any remaining material, such as Ta and/or Cr, from the sacrificial NFT structure. FIG. 13 depicts the EAMR transducer 250 after step 228 is performed. Thus, the aperture 267 in the hard mask 266 remains. However, a portion of the silicon dioxide has been removed, leaving silicon dioxide layer 264'. The sacrificial NFT structure 254' is thus exposed. Thus, step 220-228 are analogous to step 106 of the method 100.

Figure 14:
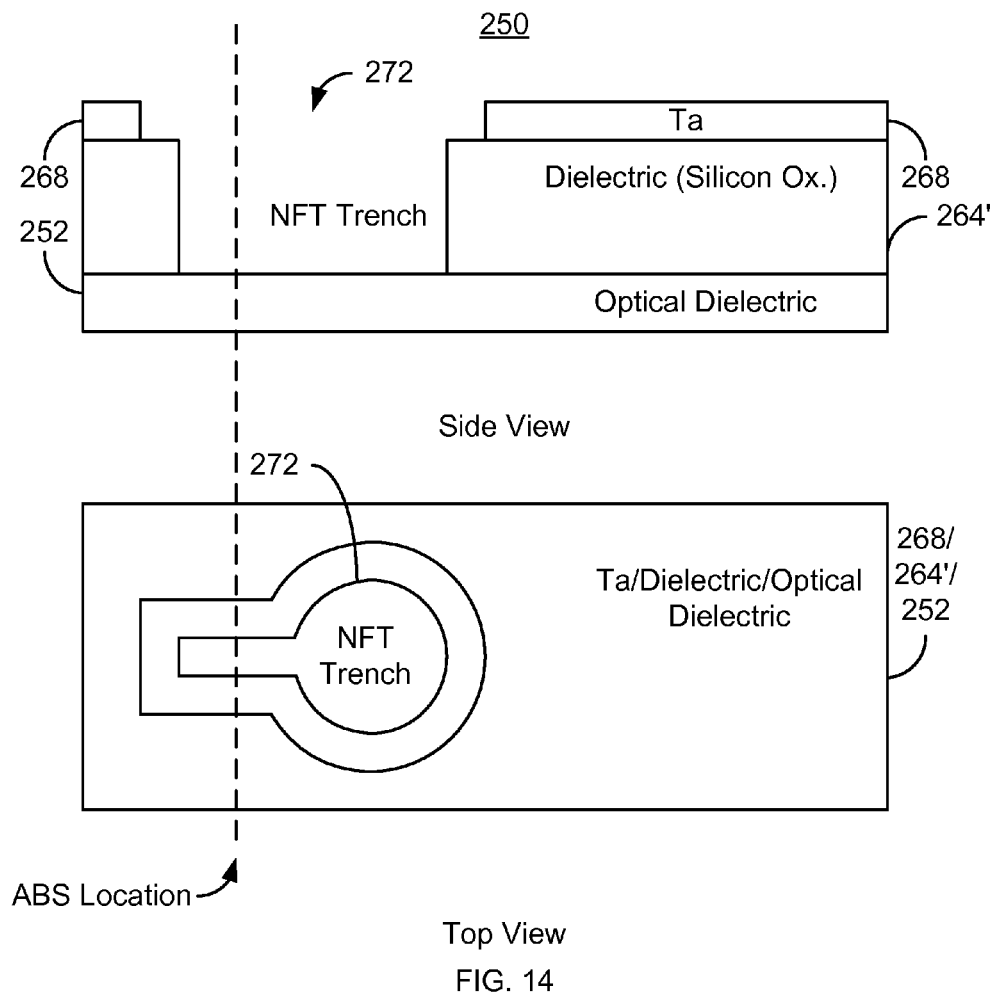

The sacrificial NFT structure 254' is removed, via step 230. Step 230 is thus analogous to step 108 of the method 100. An NFT trench is thus formed in the silicon dioxide layer 264'. Step 230 includes performing an amorphous carbon RIE. Because the layer 270 is also formed of amorphous carbon, this layer of the hard mask 266' is also removed. FIG. 14 depicts the EAMR transducer 250 after step 230 is performed. Thus, Ta layer 268 and silicon dioxide layer 264' remain. The NFT trench 272 has been exposed in the silicon dioxide layer 264'.

Figure 15:
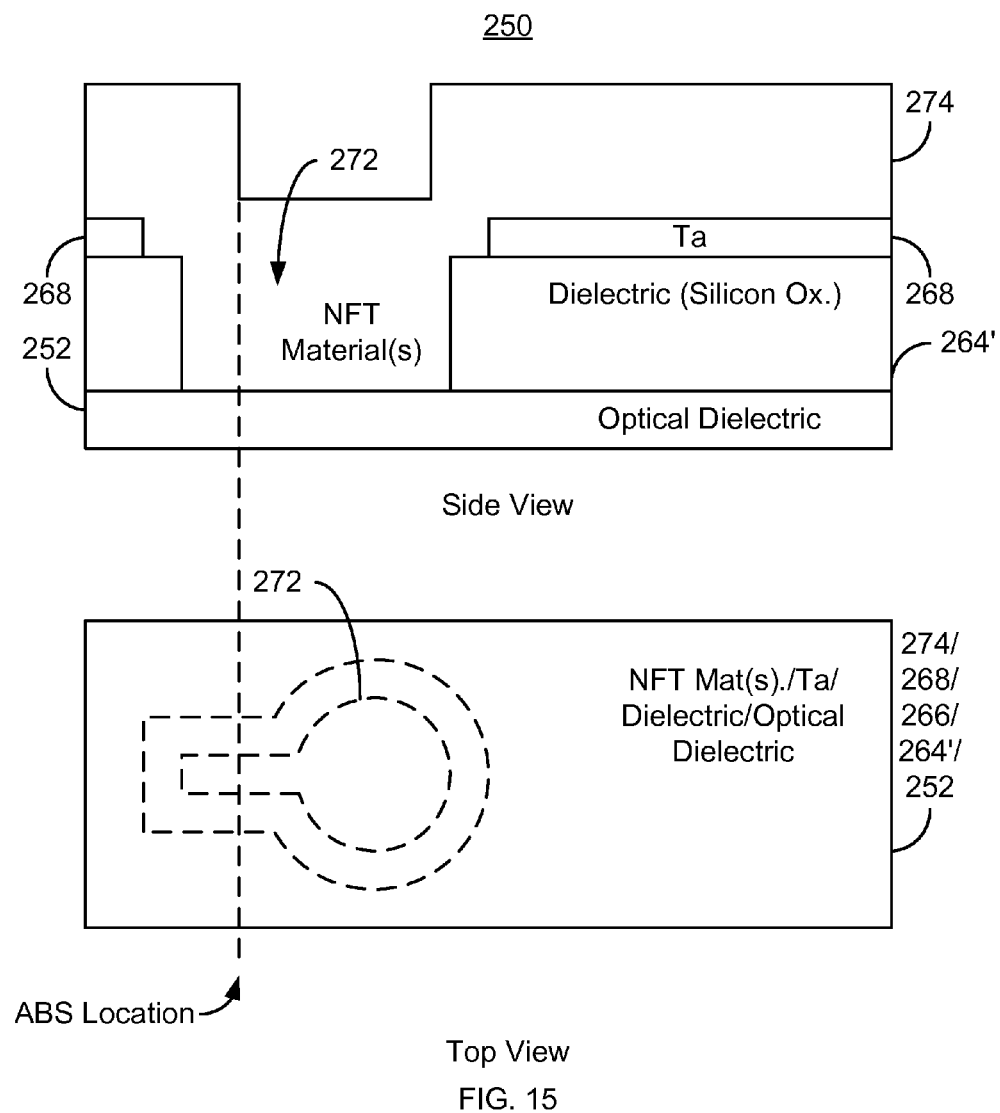

The conductive material(s) for the NFT are deposited, via step 232. Step 232 is analogous to step 110 of the method 100. In some embodiments, a gold layer for the NFT is deposited using ion beam deposition (IBD). In other embodiments, other materials and/or other deposition methods may be used. FIG. 15 depicts the EAMR transducer 250 after step 232 is performed. Thus, layer 274 is formed. A portion of the gold layer 274 resides in the NFT trench 272.

In some embodiments, a self-leveling layer is optionally deposited on the gold layer, via step 234. For example, in some embodiments, the self-leveling layer may be a material such as PMGI. In other embodiments, a metal layer may be deposited at a sufficient thickness to fill in the topology. In other embodiments, another self-leveling layer might be used.

Figure 16:
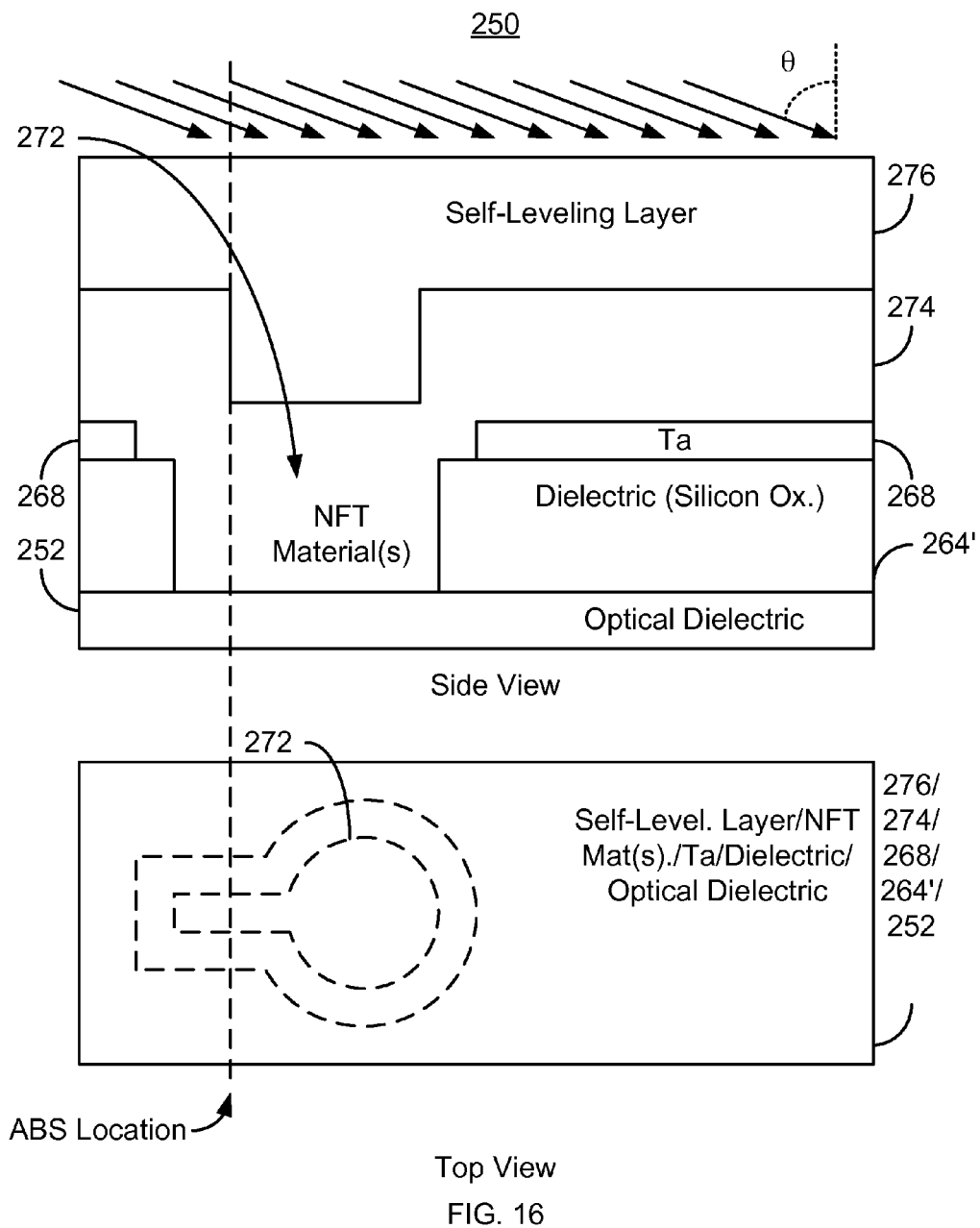
Figure 17:
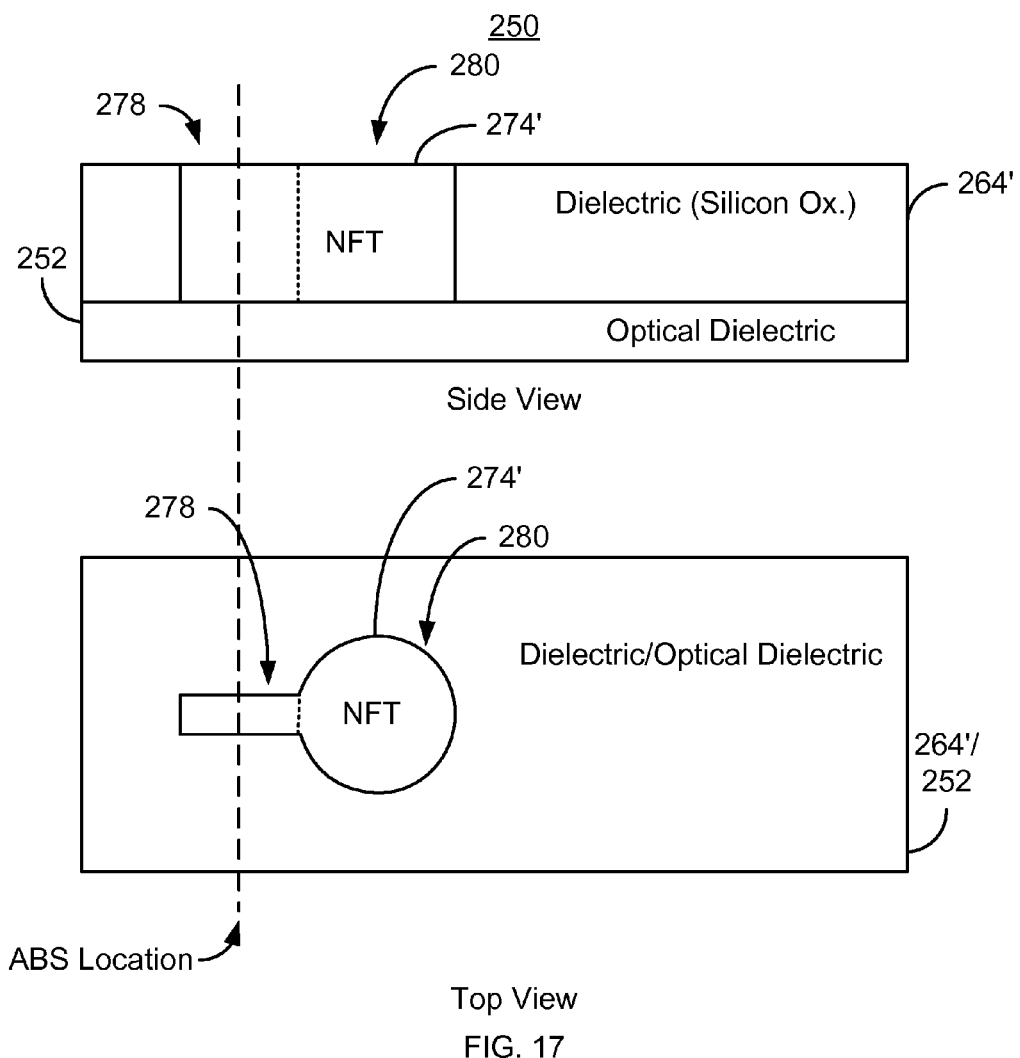

A high angle ion mill at an angle of at least seventy degrees from a normal to a top surface of the EAMR transducer is performed, via step 236. In some embodiments, the angle is substantially seventy-five degrees. The angle is also less than ninety degrees. Steps 234 and 236 are analogous to step 112 of the method 100. FIG. 16 depicts the EAMR transducer 250 during step 236 and in an embodiment in which step 234 has been performed. Thus, a self-leveling layer 276 is shown. The ion mill direction is shown by arrows, and the milling angle is the angle, θ. The high angle ion milling in step 236 removes the portion of the gold layer external to the NFT trench. The Ta layer 268 remaining may be used as an endpoint layer for determining when to terminate milling. The NFT is thereby formed. FIG. 17 depicts the EAMR transducer 250 after step 236 is performed and after the Ta layer 268 has been removed. Thus, NFT 274' is shown. The NFT 274' includes a pin 278 and a disk 280. Further, in the embodiment shown, the top of the NFT 274' is substantially coplanar with the top of the silicon dioxide layer 264'. Fabrication of the EAMR transducer 250 may then be completed.

Thus, using the method 200, the EAMR transducer 250 may be fabricated. The EAMR transducer has an NFT 274' having the desired geometry. The method 200, NFT 274', and EAMR transducer 250 share the benefits of the method 100, the NFT 120/120' and the EAMR head 150. Consequently, manufacturing, reliability, and performance of the EAMR transducer 250 may be improved.

We claim:

1. A method for providing a near-field transducer (NFT) for an energy assisted magnetic recording (EAMR) transducer the method comprising:
   forming a sacrificial NFT structure having a shape a location corresponding to the NFT;
   depositing a dielectric layer, a portion of the dielectric layer residing on the sacrificial NFT structure;
   removing at least the portion of the dielectric layer;
   removing the sacrificial NFT structure to expose an NFT trench in the dielectric layer;
   depositing at least one conductive layer for the NFT, a first portion of the at least one conductive layer residing in the NFT trench; and
   removing a second portion of the at least one conductive layer external to the NFT trench to form the NFT.

2. The method of claim 1 wherein the step of forming the sacrificial NFT structure further includes:
   depositing at least one sacrificial layer;
   depositing at least one hard mask layer on the at least one sacrificial layer;
   forming a pattern in the at least one hard mask layer corresponding to the shape and the location of the sacrificial NFT structure; and
   transferring the pattern to the at least one sacrificial layer.

3. The method of claim 2 wherein the at least one hard mask layer includes a first hard mask layer and a second hard mask layer on the first hard mask layer, the second hard mask layer having a high selectivity with respect to the first hard mask layer.

4. The method of claim 3 wherein the high selectivity is at least 10.

5. The method of claim 3 wherein the shape includes a disk and a pin and wherein the step of forming the pattern further includes:
   providing a first mask having a post pattern corresponding to the disk;
   transferring the post pattern to the second hard mask layer;
   providing a second mask having a line pattern corresponding to the pin; and
   transferring the line pattern to the first hard mask layer.

6. The method of claim 1 wherein the dielectric layer includes silicon dioxide.

7. The method of claim 1 wherein the step of removing the dielectric layer includes:
   providing a photoresist mask covering at least the sacrificial structure;
   depositing at least one hard mask layer after the photoresist mask is provided;
   removing the photoresist mask, a portion of the at least one hard mask layer being removed; and
   planarizing the EAMR transducer.

8. The method of claim 1 wherein the sacrificial NFT structure includes amorphous carbon and wherein the step of removing the sacrificial NFT structure further includes:
   performing an amorphous carbon reactive ion etch.

9. The method of claim 1 wherein the step of removing the remaining portion of the at least one conductive layer external to the trench further includes:
   performing a high angle ion mill at an angle of at least seventy degrees from a normal to a top surface of the EAMR transducer.

10. The method of claim 9 wherein the step of removing the remaining portion of the at least one conductive layer further includes:
   depositing a self-leveling layer on the at least one conductive layer before the step of performing the high angle ion mill.

11. The method of claim 10 wherein the step of depositing the self-leveling layer further includes:
   spinning on the self-leveling layer.

12. A method for providing a near-field transducer (NFT) for an energy assisted magnetic recording (EAMR) transducer the method comprising:
   forming a sacrificial NFT structure having a shape a location corresponding to the NFT, the shape including a disk and a pin, the step of forming the sacrificial NFT structure further including
      depositing an amorphous carbon sacrificial layer;
      depositing a Ta layer on the amorphous carbon sacrificial layer;
      depositing a Cr layer on the Ta layer;
      providing a first mask having a post pattern corresponding to the disk;
      transferring the post pattern to the Cr layer;
      providing a second mask having a line pattern corresponding to the pin; and
      transferring the line pattern and the post pattern to the Ta layer;
      transferring the line pattern and the post pattern in the Ta layer and the post pattern in the Cr layer to the amorphous carbon sacrificial layer;
   depositing a silicon dioxide layer, a portion of the silicon dioxide layer residing on the sacrificial NFT structure;
   providing a photoresist mask covering at least the portion of the silicon dioxide layer on the sacrificial structure;
   depositing an additional Ta layer after the photoresist mask is provided;
   depositing an additional amorphous carbon layer on the additional Ta layer;
   removing the photoresist mask, a portion of the additional Ta layer and a portion of the additional amorphous carbon layer being removed; and
   planarizing the EAMR transducer to remove at least the portion of the silicon dioxide layer;
   reactive ion etching the sacrificial NFT structure, forming an NFT trench in the silicon dioxide layer;
   depositing a gold layer for the NFT, a first portion of the gold layer residing in the NFT trench; and
   performing a high angle ion mill at an angle of at least seventy degrees from a normal to a top surface of the EAMR transducer to remove a second portion of the gold layer external to the NFT trench, thereby forming the NFT.

13. The method of claim 12 further comprising:
   depositing a self-leveling layer on the gold layer before the step of performing the high angle ion mill.

* * * * *